United States Patent
Smith

(10) Patent No.: US 9,183,482 B2
(45) Date of Patent: Nov. 10, 2015

(54) METHOD AND SYSTEM FOR DETERMINING AN ASSOCIATION OF A SET OF RADIO-FREQUENCY IDENTIFICATION TAGS

(75) Inventor: Dana S. Smith, Dana Point, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 689 days.

(21) Appl. No.: 13/350,677

(22) Filed: Jan. 13, 2012

(65) Prior Publication Data

US 2013/0181814 A1 Jul. 18, 2013

(51) Int. Cl.
*H04Q 5/22* (2006.01)
*G06K 19/073* (2006.01)

(52) U.S. Cl.
CPC .............................. *G06K 19/07327* (2013.01)

(58) Field of Classification Search
CPC .......... G06K 19/0723; G06K 7/10039; G06Q 10/08; G06F 21/35; G06F 21/6227; G06F 3/03545; G06F 3/046; H01Q 1/2225; H01Q 1/526; H01Q 1/22
See application file for complete search history.

(56) References Cited

U.S. PATENT DOCUMENTS

| | | | | |
|---|---|---|---|---|
| 6,008,727 | A * | 12/1999 | Want et al. | 340/572.1 |
| 6,176,425 | B1 * | 1/2001 | Harrison et al. | 235/385 |
| 6,249,226 | B1 * | 6/2001 | Harrison et al. | 340/572.1 |
| 6,342,830 | B1 * | 1/2002 | Want et al. | 340/10.1 |
| 6,446,208 | B1 * | 9/2002 | Gujar et al. | 713/185 |
| 6,519,550 | B1 | 2/2003 | D' Hooge et al. | |
| 6,882,953 | B2 | 4/2005 | D' Hooge et al. | |
| 8,833,664 | B2 * | 9/2014 | Choi | 235/492 |
| 2002/0148655 | A1 | 10/2002 | Cho et al. | |
| 2005/0020303 | A1 | 1/2005 | Chan | |
| 2005/0093837 | A1 | 5/2005 | Singer | |
| 2006/0017570 | A1 * | 1/2006 | Moskowitz et al. | 340/572.7 |
| 2006/0187046 | A1 * | 8/2006 | Kramer | 340/572.3 |
| 2008/0016711 | A1 * | 1/2008 | Baebler | 33/559 |
| 2008/0055279 | A1 | 3/2008 | Osada et al. | |
| 2008/0141361 | A1 * | 6/2008 | Balfanz | 726/17 |
| 2008/0150916 | A1 * | 6/2008 | Vos | 345/179 |
| 2009/0045960 | A1 * | 2/2009 | von Gutfeld | 340/572.3 |
| 2010/0079414 | A1 | 4/2010 | Ferlitsch | |
| 2010/0207729 | A1 * | 8/2010 | Ko et al. | 340/10.1 |
| 2011/0090060 | A1 * | 4/2011 | Tavshikar | 340/10.3 |
| 2012/0087501 | A1 * | 4/2012 | Shoarinejad et al. | 380/270 |

OTHER PUBLICATIONS

"Checking the Total Integrity of an LF System" Application Report, Mar. 2011, pp. 1-12, Literature No. SCBA021,Texas instruments, Dallas, Texas.

* cited by examiner

*Primary Examiner* — Kerri McNally
*Assistant Examiner* — Renee Dorsey
(74) *Attorney, Agent, or Firm* — Brooks Acordia IP Law, P.C.; Pejman Yedision; David Ripma

(57) ABSTRACT

Devices, methods, and systems comprising one or more shielding elements repositionable, e.g., slidably disposed, along a structure, e.g., a stylus, the structure further comprising a set of one or more radio-frequency identification (RFID) tags, where the one or more shielding elements effect the radio frequency (RF) transmissibility of the set of one or more RFID tags, and a computing device comprising a processor, where the processor is configured to determine an association of a set of received one or more RFID tags with a unique identifier.

20 Claims, 11 Drawing Sheets

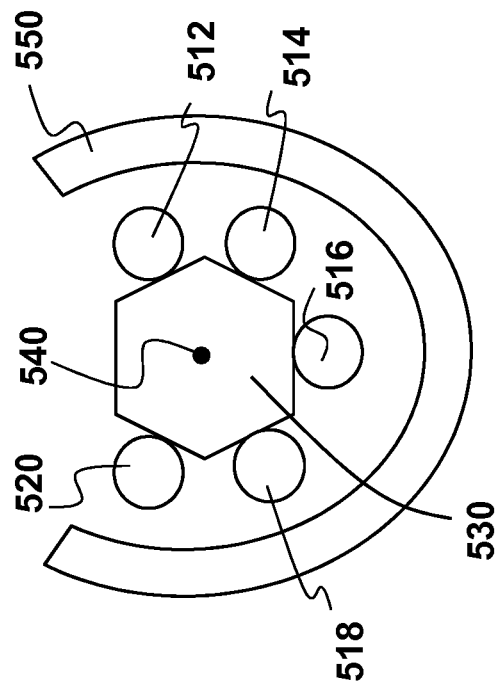
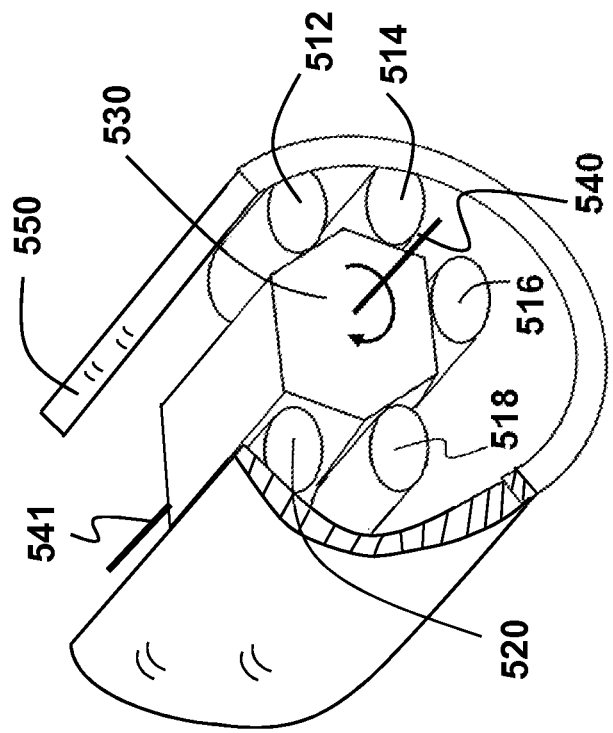
FIG. 5B
FIG. 5A

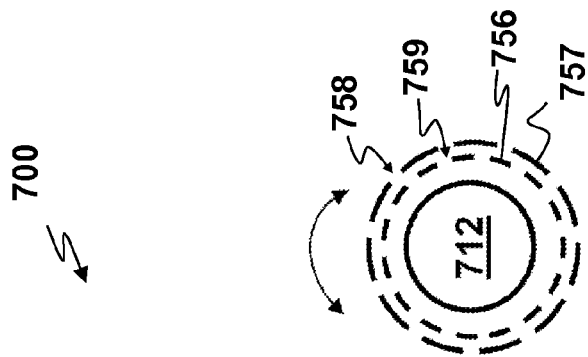
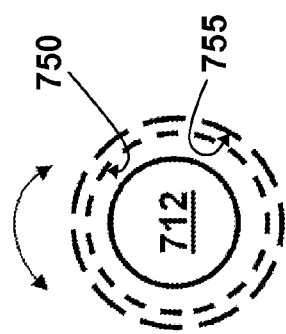
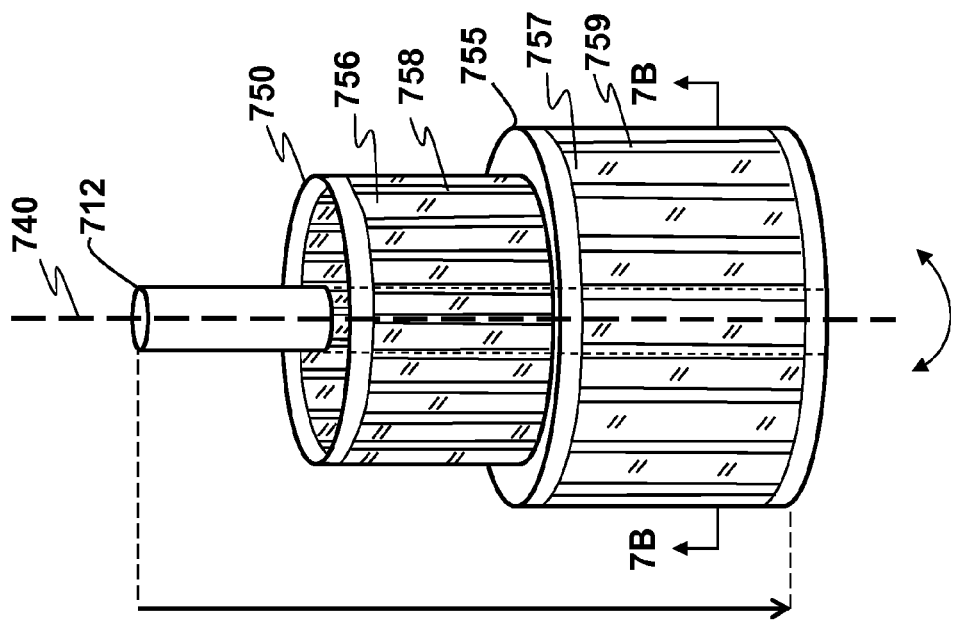

METHOD AND SYSTEM FOR DETERMINING AN ASSOCIATION OF A SET OF RADIO-FREQUENCY IDENTIFICATION TAGS

BACKGROUND

Typically a display may be used in a collaboration environment to effect the capturing and sharing of information and allow the input or display of information, such as charts, tables, videos, and presentations, via, for example, a surface where users interact with each other using, for example, a pen, an anatomical digit, or a stylus.

SUMMARY

Embodiments include methods, systems, and devices where, for example, a system embodiment may include one or more shielding elements repositionable along a structure, e.g., a stylus, the structure further comprising a set of one or more radio-frequency identification (RFID) tags, where the one or more shielding elements effect the radio frequency (RF) transmissibility of the set of one or more RFID tags, and a first computing device comprising a processor, where the processor is configured to: determine an association of a set of received one or more RFID tags with a unique identifier. Optionally, the one or more shielding elements are slidably disposed along the structure. In one embodiment of the system the one or more shielding elements effect the RF transmissibility of the set of one or more RFID tags via physical movement of the one or more shielding elements relative to the set of one or more RFID tags. Optionally, one or more shielding elements are radio-frequency shielding elements. Optionally, the set of one or more RFID tags and one or more shielding elements are disposed within the structure. In one embodiment, the system further includes a transceiver, where the transceiver comprises a transmitter and receiver and where the computing device comprises the transceiver. Optionally, the system comprises a second computing device comprising a processor and where the second computing device comprises the transceiver. In one embodiment, a member of the set of one or more RFID tags is an active RF element. Optionally, a member of the set of one or more RFID tags is a passive RF element. Optionally, at least one of: the first computing device; the second computing device; and the transceiver, is an active RF element.

Other embodiments include methods, systems, and devices where, for example a device embodiment may include (a) one or more shielding elements and (b) a set of one or more radio-frequency identification (RFID) tags, where the device is configured to: (i) shield the one or more shielding elements, where the one or more shielding elements are repositionable along a structure, e.g., a stylus, and (ii) emit radio frequency energy from a set of one or more RFID tags, where the RF emissions of the set of one or more RFID tags are based on a disposition of the shielding elements along the structure. Optionally, the one or more shielding elements effect the RF transmissibility of the set of one or more RFID tags via physical movement of the one or more shielding elements relative to the set of one or more RFID tags. Optionally, the one or more shielding elements are slidably disposed along the structure.

Other embodiments include methods, systems, and devices where, for example a method embodiment may include the steps of: (a) emitting radio frequency energy from a set of one or more radio-frequency identification (RFID) tags, wherein the set of one or more RFID tags are disposed in a structure, e.g., a stylus; (b) shielding the set of one or more RFID tags by one or more shielding elements, where the one or more shielding elements are repositionable along the structure; and (c) associating, by a computing device, the set of emitted one or more RFID tags with a unique identifier, where the associating is based on the disposition of the one or more shielding elements relative to the one or more RFID tags. In one embodiment, the method may also include the step of: (d) determining, by the computing device, a set of one or more attributes associated with the RFID tags based on the associated unique identifier. Optionally, the one or more shielding elements effect the transmissive capability of the set of one or more RFID tags.

BRIEF DESCRIPTION OF THE DRAWINGS

Embodiments are illustrated by way of example and not limitation in the figures of the accompanying drawings, and in which:

FIG. 5A depicts an embodiment of a shielding enclosure comprising a shuttering apparatus;

FIG. 5B shows the aperture slit of the shielding enclosure from the cross-sectional view;

FIG. 7A depicts, in an exploded view, another alternate geometry of the shielding enclosure;

FIG. 7B depicts a collapsed cross-sectional view showing an RFID tag disposed within the two shielding enclosure cylinders;

FIG. 7C depicts a collapsed cross-sectional view showing an RFID tag disposed within the two shielding enclosure cylinders as rotated along the longitudinal axis of rotation;

DETAILED DESCRIPTION

Figure 1A:
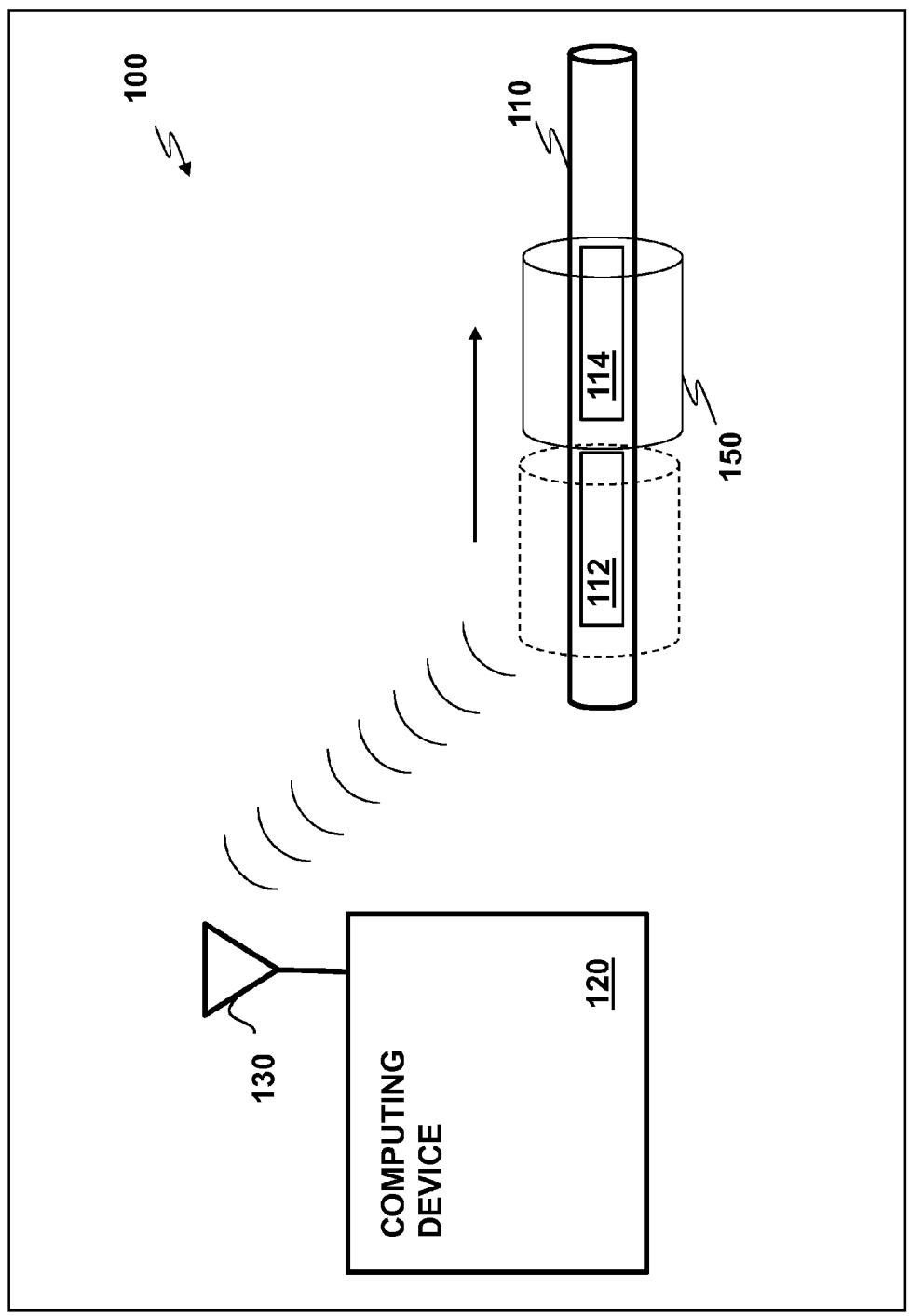
FIG. 1A is a functional block diagram depicting an exemplary interactive collaboration system environment.

FIG. 1A is a functional block diagram depicting an exemplary interactive collaboration system environment 100. In an interactive collaboration system environment 100 a structure 110 may comprise a set of one or more radio-frequency identification (RFID) tags 112, 114, one or more shielding elements 150, and a computing device 120, where the computing device may further comprise a receiving element, e.g., an antenna 130, for receiving radio-frequency signals. In one embodiment, the RFID tags 112, 114, may be at least one of: a passive-functionality and an active-functionality. In the embodiment where the RFID tags are of the passive-functionality, received electromagnetic waves may be utilized to power the RFID tags. In the embodiment where the RFID tags are of the active-functionality, the RFID tags may comprise, or may have available, a source of electrical power, e.g., local power supply such as one drawing power from a battery. The structure 110 is depicted as having RFID tags 112, 114 where the shielding element 150 affects the effective radio frequency emissivity of a proximate RFID tag 112. The structure may be a housing object form factor that may allow for an enclosure, e.g., a stylus, a cylindrical writing tool, or a hand-held rod-shaped object. In one exemplary embodiment, the set of one or more passive-functionality RFID tags may be mechanically and/or electrically shielded, where the RFID tags may not be energized and queried in the presence of an antenna. In one embodiment, the shielding may be displaced mechanically or electrically, such that the RFID tags may be remotely energized, e.g., wirelessly. In the embodiment where the RFID tags are remotely energized, the RFID tags may respond to data queries requesting data that may be associated with the set of one or more RFID tags.

FIG. 1A further depicts the shielding element 150 translated along the structural element to allow the radio frequency (RF) emission of the RFID tag 114, i.e., via the displacement of the shielding element 150 where the RFID tag is disposed within or along the structure 110. In one exemplary embodiment, based on the received identification data associated with the RFID tags 112, 114, the computing device 120 may determine an association of a unique identifier with the structure 110 comprising the set of one or more RFID tags 112, 114. In this exemplary embodiment, the structure may accordingly broadcast differing identification tags based on the shielding and un-shielding of one or more of the set of one or more RFID tags. Accordingly, the antenna of the computing device may then receive the different identification tags.

In one exemplary embodiment, the blocking of the RF propagation by the shielding elements and relative to the RFID tags, may change the state of the RF emissivity of the structure. In one embodiment where the shielding elements block the RF energy of the RFID tags, the shielding quality of the shielding elements may be, for example, the inner surface of the shielding element that is proximate to the RFID tags. In this exemplary embodiment, the shielding surface may be at least one of: reflective surface and absorptive surface. The computing device 120 may then receive, via the antenna 130, the RF transmission of the set of one or more RFID tags 112, 114 not being shielded. In one embodiment, an RFID tag may provide a unique identifier where a computing device may assign or associate a set of attributes to the unique identifier once an RFID tag, and the associated device, are identified. The computing device 120 may determine the set of attributes, e.g., a digital "ink" color associated with the identifier for the structure 110—based on the determined unique identifier, and optionally based on the signal strength and/or the radio frequency of the transmitting RFID tag.

Figure 1B:
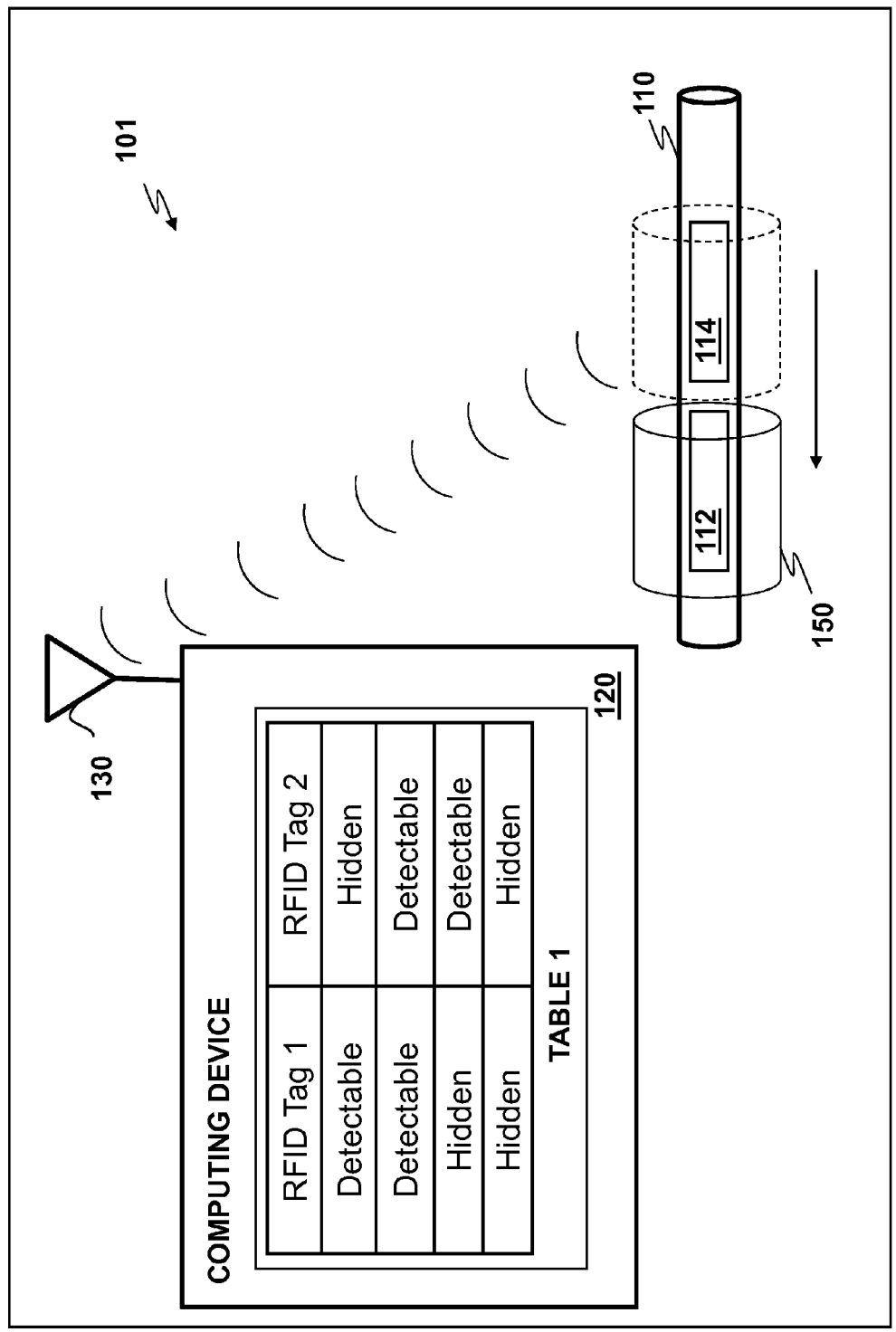
FIG. 1B is a functional block diagram depicting the exemplary interactive collaboration system environment comprising a table illustrating the state of the RFID tags.

FIG. 1B is a functional block diagram depicting the exemplary interactive collaboration system environment 101 of FIG. 1A, where the computing device 120 further comprises a table illustrating the state of the RFID tags 112, 114 based on the placement of the shielding element 150. Table 1 further depicts a set of states based on the shielding of the exemplary RFID tags 112, 114. The embodiment depicted in Table 1 comprises a set of two RFID tags and one or more shielding elements, where, based on the degree to which the shielding elements are shielding the transmissions of the RFID tags, four different states may be determined. In the exemplary embodiment, the set of one or more RFID tags may be one of: detectable state or hidden state; where in the hidden state the shielding element may be shielding and preventing the effective transmission of the RFID tag.

In one exemplary embodiment, an electronic whiteboard may be in communication with a computing device, via for example a network link, where the computing device may execute a set of one or more instructions, e.g., a whiteboard interaction, computer-executable application. In an embodiment comprising the whiteboard interaction computer-executable application, information pertaining to the state of an associated structure, e.g., a stylus or a marker pen, may be obtained. The application may be executed, for example, by the computing device comprising a processor and memory, where an image display device, e.g., a flat panel display, may be associated with the computing device.

Optionally, the image display device, in addition to displaying functions, may comprise a transceiver, and a processor and memory, that together may also be associated with the display. A transceiver may be defined as a device comprising both a transmitter and a receiver, where in certain embodiments, the transmitter and receiver may share common circuitry. The antenna and transceivers may effect the communication between the image display and the structure via, for example, radio frequency signals. The transceiver signals may be in the form of messages which may, for example, contain data identifying elements to identify the presence of an electronic tag, e.g., an RFID tag. In some embodiments, the transceiver signals may be associated with the states related to mechanical movements of the shielding elements relative to the structures. Exemplary mechanical movements include: depressing a stylus tip, depressing a button on the structure enabled by gripping the structure, releasing a button by lifting the structure, and/or actuating a roller mechanism by translating the structure on a surface or manipulating a wheel.

Figure 2:
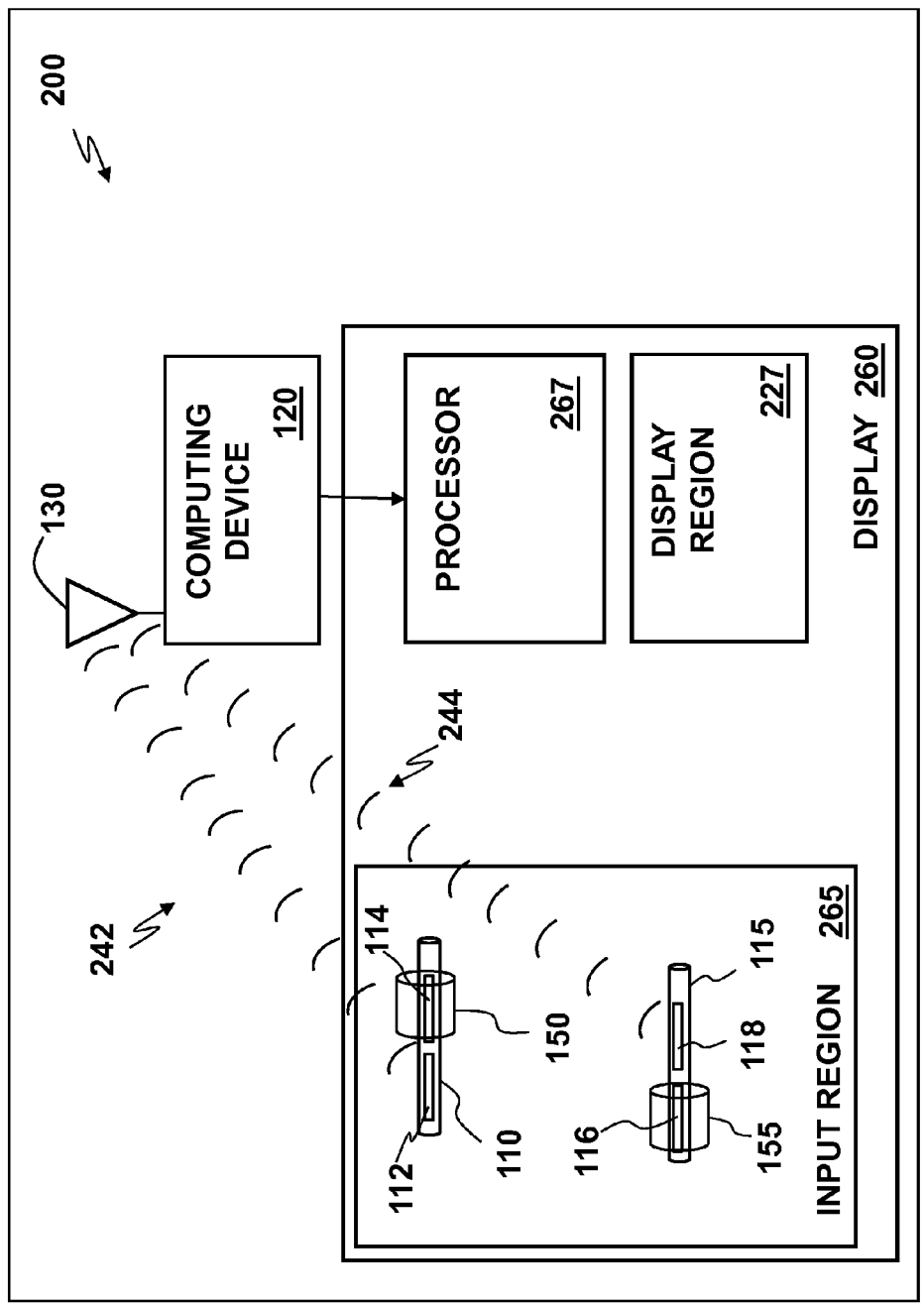
FIG. 2 depicts a functional block diagram depicting an exemplary interactive collaboration system environment comprising a set of structures.

FIG. 2 depicts a functional block diagram depicting an exemplary interactive collaboration system environment 200 where a collaboration environment may comprise a set of structures 110, 115, where the first structure 110 comprises a set of one or more RFID tags 112, 114, one or more shielding elements 150, 155 and the second structure 115 comprises a set of one or more RFID tags 116, 118. FIG. 2 further depicts the system as comprising: a computing device 120, an antenna 130, and a display 260, e.g., a virtual whiteboard. The display 260 may comprise an input region 265, e.g., surface area for nonpermanent markings, and optionally a display region 227, where the display may be distal from the antenna 130 as relative to the computing device 120. A distance from a reference point of the display 260 to a reference point of the set of structures 110, 115 comprising the set of one or more RFID tags 112, 114, 116, 118 may also be determined. The antenna 130 is depicted by example in FIG. 2 as receiving a set of one or more radio frequency signals 242, 244. The display 260 may be operably coupled to the computing device 120 where the computing device 120 may be configured to accept and store a rule set that may be pre-determined, pre-programmed, and/or inputted by a user via a user interface. Embodiments of the interactive collaboration system environment 200 may be executed in real-time or near real-time, and information from the antenna 130 may be communicated to the computing device 120 in real-time or near real-time. In some embodiments, the display 260 may comprise, for example, a processor 267 and memory and may function as a computer processing device. The antenna 130 may receive radio waves, i.e., analog radio frequency signals and a rule set may be determined and executed based on the received radio waves and distance of the reference point of the object to the display 260. The rule set of each image display may additionally contain a set of instructions associated only with the specific display 260 and/or computing device 120. In this exemplary embodiment, a stylus 110, 115 may be associated with a particular user, and the user-stylus association may permit use of multiple styli in the same interactive system.

In one exemplary embodiment, a structure, e.g., a stylus, may be used in conjunction with display devices, e.g., touch screen, where both finger touch and stylus touch may be used. In this exemplary embodiment, the use of the structure—where the structure comprises a set of one or more RFID tags—may determine if the input to the computing device is via a stylus or a portion of an anatomical digit, e.g., a fingertip. In some embodiments, an application may be executed on the computing device where the application may respond and/or execute a set of instructions based on the determined input method, e.g., a stylus or fingertip. For example, the stylus tip may be interpreted as drawing objects, whereas a fingertip may be interpreted as moving a graphical object via, for example, gestures. Optionally, a method, e.g., a radio triangulation method, may be employed to determine the location or approximate position of the stylus tip via tracking the RFID tags in relation to the whiteboard surface. In one exemplary embodiment, the computing device may determine the proximity of the stylus to the surface and may further determine whether the structure, e.g., stylus, is in contact with the surface, e.g., in a "pen down" state, or not in contact with the surface, e.g., "pen up" state.

Figure 3:
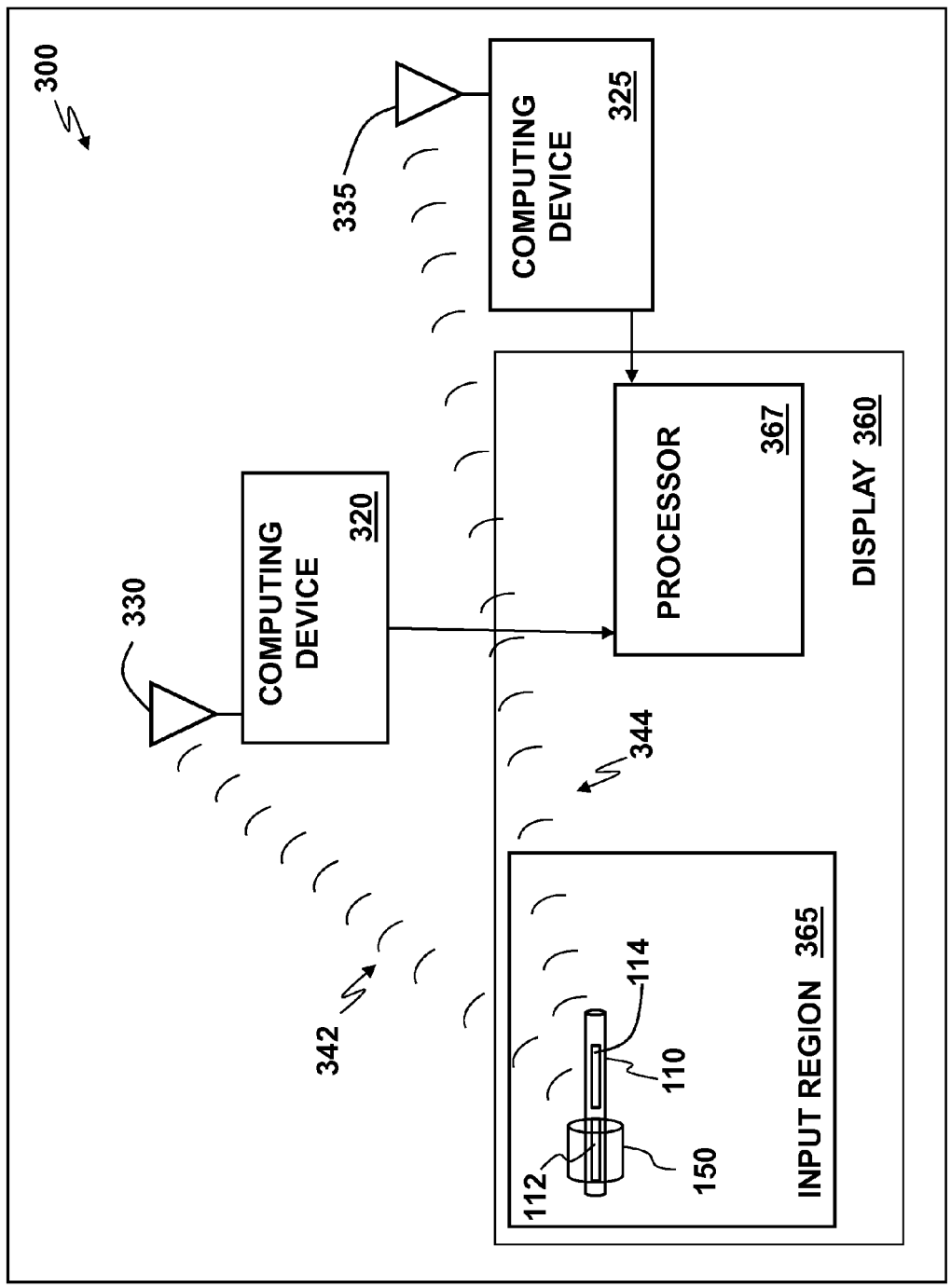
FIG. 3 is a functional block diagram depicting an exemplary interactive collaboration system environment.

FIG. 3 is a functional block diagram depicting an exemplary interactive collaboration system environment 300. In one embodiment a collaboration environment may comprise a structure 110, e.g., a stylus, where the structure 110 comprises a set of one or more RFID tags 112, 114, one or more shielding elements 150, a first computing device 320, a second computing device 325, a first antenna 330, a second antenna 335, and a display 360, where the display 360 may comprise an input region 365. The first antenna 330 and second antenna 335 are depicted as receiving a set of one or more radio frequency signals 342, 344 that may be emitted by the RFID tag 114 disposed in the structure 110. In one embodiment, based on a distance from a reference point of the display 360 to a reference point of the structure 110, the computing device may determine an association between the received radio frequency signals 342, 344 and a unique identifier. Optionally, the computing devices 320, 325 may be operably coupled to the display 360 where the display 360 comprises a processor 367 and memory. In one embodiment, based on the strength of the received radio waves, i.e., radio frequency signals, the computing device may determine whether to associate the received RFID tag with a unique identifier. The computing device may determine the association based on a threshold setting that may be correlated with the relative distance of the structure to the display 360. Optionally, the rule set of each display may additionally execute a set of instructions based on the radio frequency signal strength of the structure to the display 360 and/or computing devices 320, 325. In this exemplary embodiment, the structure 110 may be associated with a particular user that may allow a set of different rule sets to be executed based on the computing device to which the structure may be associated.

Figure 4:
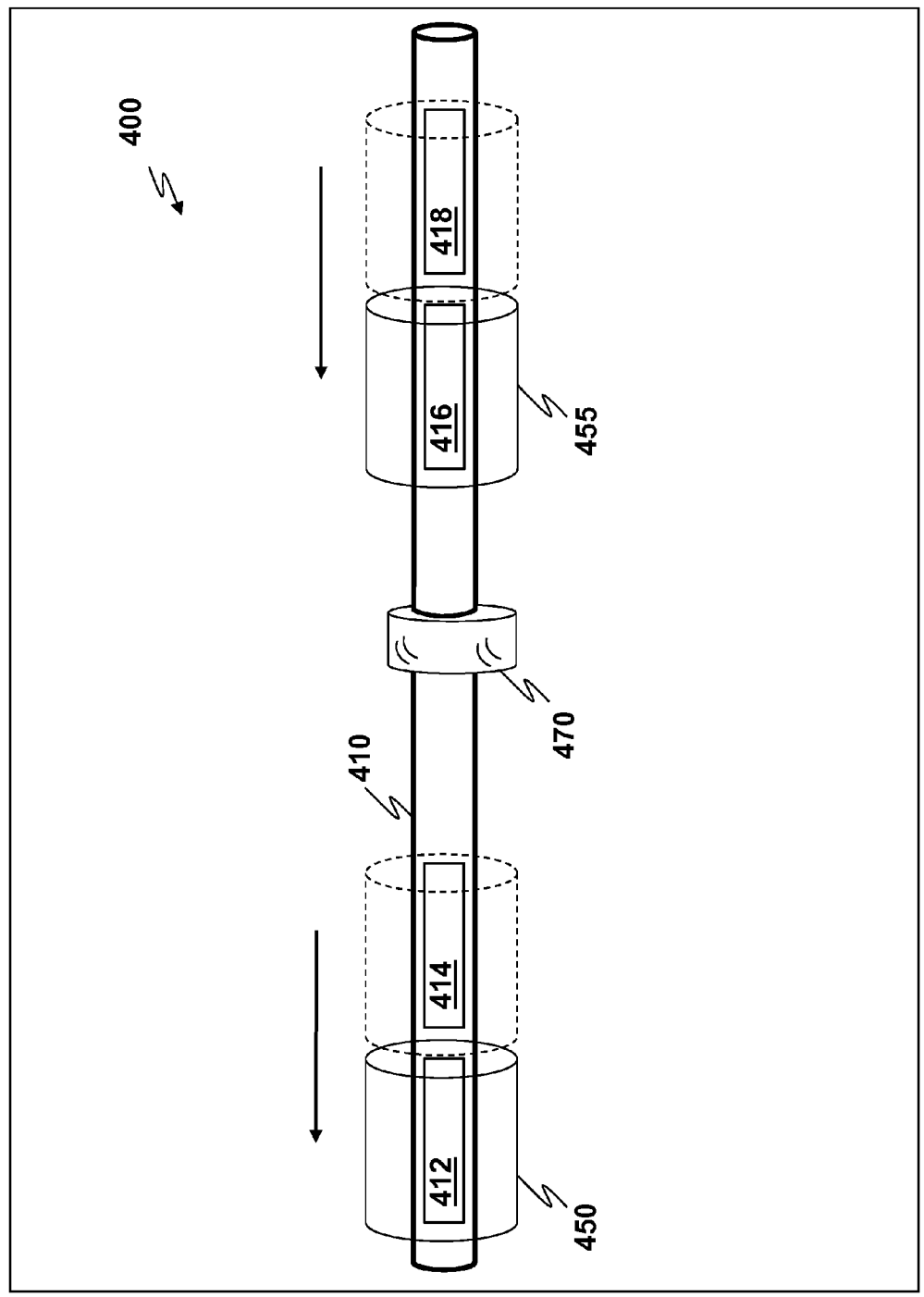
FIG. 4 depicts an embodiment of a shielding enclosure where the method of mechanical shielding may be implemented on both ends of a structure.

FIG. 4 depicts an embodiment where the method of mechanical shielding may be implemented on both ends of a structure having a proximal and distal end, e.g., both ends of a stylus. In this exemplary embodiment, one end of the structure may function as the stylus tip with a detectable state and the opposite end of the structure may function as a state changer or, for example, an eraser tool. In another embodiment, one end of the structure may function as a stylus with a differently defined system function mapping, e.g. a mapping that may invoke a brush stroke, a wide-tip marker stroke delivery, or alternate "ink" color palette mapping. In this exemplary embodiment, the structure may be assembled in a double-ended fashion, where the structure may comprise a separator 470, e.g., barrier disposed between two ends of the structure to effect the physical separable spatial disposition of the shielding elements 450, 455, and where each end may comprise a set of one or more RFID tags 412, 414, 416, 418. Optionally, the mechanical attributes of the ends may be adjusted to generate usage expectations, e.g., where the shielding may indicate different states, e.g., color code, erase code, and the computing device (not shown) may determine the state of each end of the structure. In another exemplary embodiment, a stylus may be associated with a set of properties, e.g., such properties as the color of digital ink or the width of strokes produced.

In some embodiments, the set of one or more RFID tags may be surrounded by a conductive enclosure where the enclosure is designed to permit passage of the radio frequency waves through apertures, e.g., lineal apertures such as slits in the surface of an otherwise RF-shielding outer shell. For example, when in the open state, the shield may be RF leaky and inefficient, i.e., emit the radio frequency signals. When in the closed state, the shielding efficiency may be increased and the signal reaching the enclosed passive RFID tag may be attenuated or blocked. In this embodiment, the signal attenuation may prevent sufficient energy to transfer and activate a response from the passive tag, or prevent signal reception or transmission by an active tag.

Figure 5D:
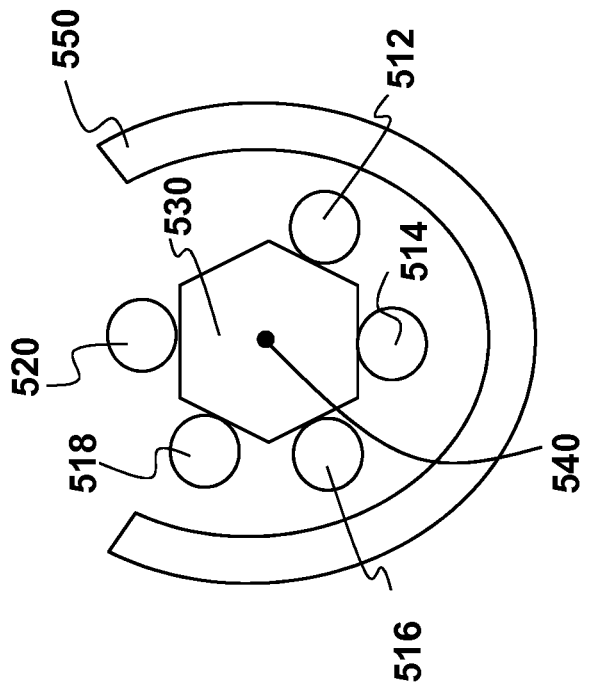
FIG. 5D depicts a cross-sectional view of the shielding enclosure of FIG. 5C.
Figure 5C:
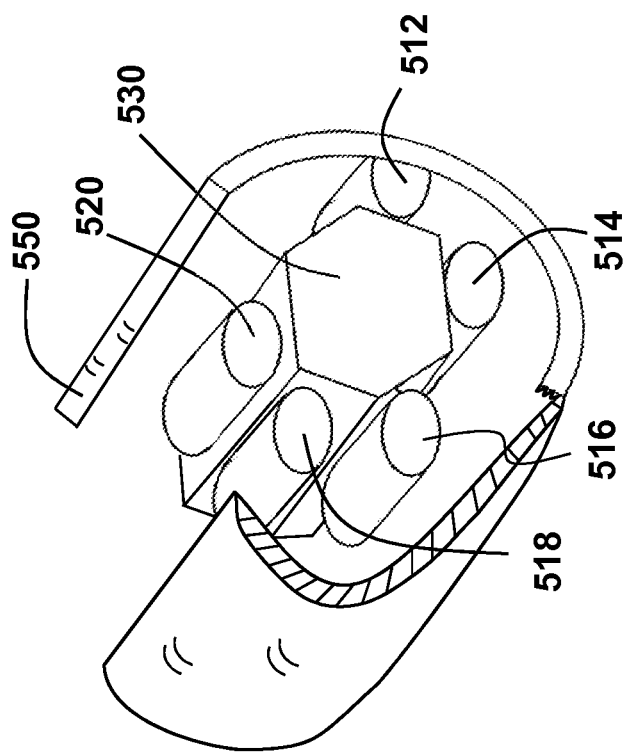
FIG. 5C depicts the cylindrical shielding enclosure where the set of one or more RFID tags have been rotated.

FIGS. 5A-5D depict an embodiment of a shielding enclosure comprising a shuttering apparatus, where the shielding enclosure may emit radio frequency signals when in an "open" state, and, when in the "closed" state, shield the emission of radio frequency signals of the set of one or more RFID tags. FIG. 5A depicts an exemplary cylindrical shielding enclosure 550 where the set of one or more RFID tags 512, 514, 516, 518, 520 may be disposed inside the cylinder 550. The set of one or more RFID tags 512, 514, 516, 518, 520 may be positioned on an exemplary prismatic uniform polyhedron rotational element 530 rotatable 541 about a longitudinal axis of rotation 540. In this exemplary embodiment, the set of one or more RFID tags 512, 514, 516, 518, 520 may each be positioned along a surface associated with a side of the six surfaces of the prismatic uniform polyhedron rotational element 530. FIG. 5B is a cross-sectional view of the shielding enclosure 550 of FIG. 5A showing the hexagonal cut-out shape of the prismatic uniform polyhedron 530, and the set of one or more RFID tags 512, 514, 516, 518, 520. FIG. 5B further shows the lineal aperture, or slit, of the shielding enclosure from the cross-sectional view where the set of one or more RFID tags 512, 514, 516, 518, 520 are all shielded by the shielding enclosure 550, thereby effecting the RF emissions of the RFID tags. FIG. 5C depicts the cylindrical shielding enclosure 550 where the set of one or more RFID tags 512, 514, 516, 518, 520 disposed inside the cylinder 550 have been rotated about the axis of rotation by one surface. (See FIG. 5B) FIG. 5D depicts a cross-sectional view of the shielding enclosure 550 of FIG. 5C showing the hexagonal cut-out shape of the prismatic uniform polyhedron 530, and the set of one or more RFID tags 512, 514, 516, 518, 520. FIG. 5D further shows the lineal aperture, or slit, of the shielding enclosure from the cross-sectional view where one of the RFID tags 520 of the set of one or more RFID tags 512, 514, 516, 518, 520 is exposed through the lineal aperture, or slit, of the shielding enclosure 550. The exposed RFID tag 520 may then be activated via, for example, receiving radio frequency energy transmitted by a transmitter antenna or a transceiver antenna, and in response to a data query, emit radio frequency signals.

Figure 6A:
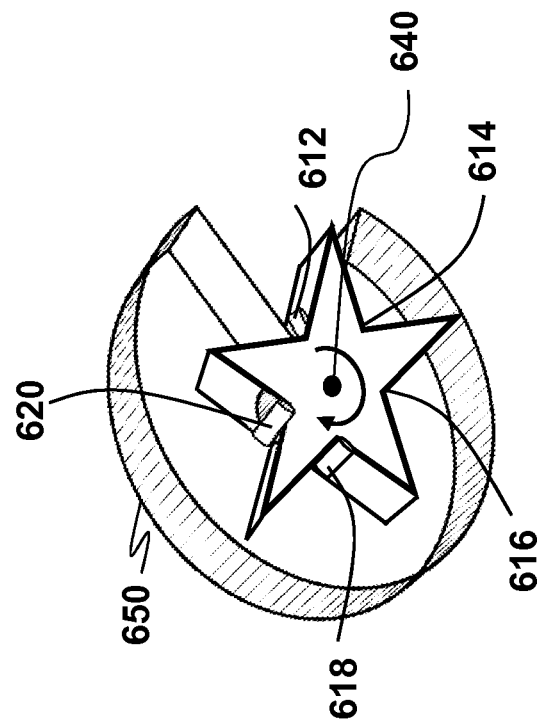
FIG. 6A depicts an alternate geometry of the shielding enclosure of FIG. 5A.
Figure 6B:
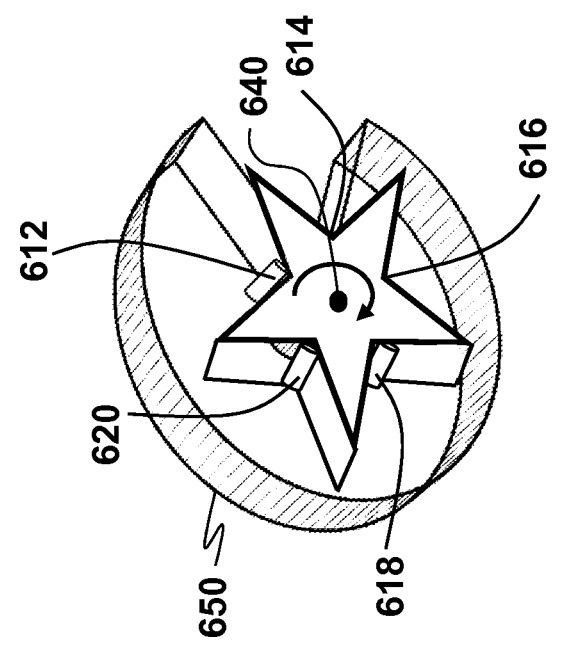
FIG. 6B depicts the aperture slit of the shielding enclosure as exposing one of the RFID tags through the aperture slit of the shielding enclosure.

FIGS. 6A-6B depict an alternate geometry of the shielding enclosure of FIG. 5A, where the set of one or more RFID tags 612, 614, 616, 618, 620 may be disposed inside the cylinder 650 and where the set of one or more RFID tags 612, 614, 616, 618, 620 may be positioned on multi-armed, e.g., a pentagonal, rotational element 630 rotating about a central axis 640. FIG. 6A depicts the set of one or more RFID tags 612, 614, 616, 618, 620, each disposed at the intersection of two arms, as all being shielded by the shielding enclosure 650, thereby effecting the RF transmission capability of the RFID tags. FIG. 6B depicts the lineal aperture, or slit, of the shielding enclosure as exposing one of the RFID tags 612 of the set of one or more RFID tags 612, 614, 616, 618, 620 through the lineal aperture, or slit, of the shielding enclosure 650. The exposed RFID tag 620 may then be activated via, for example, receiving radio energy transmitted by a transmitter antenna, or a transceiver antenna, and in response to a data query, emit radio frequency signals.

FIG. 7A depicts, in an exploded view, another exemplary embodiment alternate geometry of the shielding enclosure 700, where an RFID tag 712 may be disposed inside an inner cylinder 750, and an outer cylinder 755, where the inner cylinder 750 has a smaller diameter than the outer cylinder 755. In this exemplary embodiment, both cylindrical housings may comprise lineal apertures 758, 759, for example, slit windows, and slit shields 756, 757 along the surface of each cylinder 750, 755. The RFID tag 712 may be coaxially mounted on the inner cylinder 750 having a smaller diameter than the outer cylinder 755. Optionally, the inner cylinder 750 and outer cylinder 755 may rotate about a longitudinal axis of rotation 740. A collapsed cross-sectional view of the shielding enclosure housing is depicted in FIG. 7B showing an RFID tag 712 disposed within the two cylinders 750, 755. In this exemplary embodiment, the rotation of the outer cylinder 755 or inner cylinder 750 may open or close the exposed area, i.e., the lineal apertures 758, 759, of the shielding elements based on the disposition of the cylinders 750, 755. FIG. 7C further shows the physical spatial disposition of the two shielding enclosure cylinders 750, 755 as they may have rotated along the longitudinal axis of rotation. For example, the rotation of the outer cylindrical housing 755 and/or inner cylindrical housing 750 may open or close the lineal apertures 758, 759 to effect the emissivity area of the shielding enclosures. In this exemplary embodiment, the slit shields 756, 757 of both cylinders 750, 755 may be aligned thereby also aligning and exposing the lineal apertures 758, 789 of both cylinders 750, 755. In this example, the physical spatial disposition of the outer cylindrical housing 755 and/or inner cylindrical housing 750 may expose the RFID tag 712 to the radio frequency signals transmitted by a transmitter antenna or a transceiver antenna and identifiable via the lineal apertures 758, 759.

In an alternative embodiment, an electrical switch, e.g., a push-button type switch such as a "make-before-break" switch, may enable and/or disable the transmission ability of one or more RFID tags, where the RFID tags may be passive tags deriving actuation power from the electric field of an RF sensing antenna. In one embodiment, instead of mechanical displacement of electromagnetic shielding, an electrical switch may determine, via, for example, direct circuit interception, or via shielding circuit completions, which of two tags will receive power and transmit data. In an exemplary embodiment of the electrical switch design, it may be possible to allow for different response states since the switch may momentarily connect both circuits. The intermediate or transitional state of both tags being "On" may be used with temporal history to avoid "pen down" uncertainty if the user does not apply sufficient pressure continuously to activate the tags to establish one of the binary states. This mode of operation may provide a form of operational hysteresis, or damping, that may prevent "pen skip" gaps in the digital ink trace.

In one embodiment, a shielding may be guided by a mechanical pathway that may allow the shielding element to slide from one end of the structure to the other end of the structure, for example, where the sliding motion and resulting shield disposition may be due to the influence of gravity. In some exemplary embodiments, two RFID tags may be disposed within the shielding path where the RFID tags may be positioned such that, in one orientation, a first tag is unshielded and a second tag shielded. In this exemplary embodiment, when in an inverted orientation, the shielding element may be displaced so as to reverse the tag shielding by shielding the other—i.e., the second—RFID tag instead of the first tag. The shielding mechanism may be disposed in a structure that may rest steadily on a flat and/or even surface. One example of the gravity-exploitive embodiment may be a virtual hourglass where each orientation of the hour glass may determine a different RFID tag shielding. The effect upon the emissivity of a tag may be based on the resulting relative spatial relationship of the shield and RFID tag, and accordingly, physical movement may involve the movement of at least one of: the shielding element relative to the RFID tags; the RFID tags relative to the shielding element; and both the shielding element and RFID tags in relation to some supporting structure. In one exemplary embodiment, the shielding enclosure may comprise of an open-ended housing, where the open-ended housing may shield the radio frequency signals associated with the particular RFID tag. For example, an exemplary mechanical movement of the shielding element may be based on a gravitational pull. The shielding element may be guided by a mechanical pathway that may allow the shielding element to slide from one end of the structure to another, along an axis of the structure, e.g., along the axis of the stylus. In one embodiment, a set of one or more RFID tags may be positioned along the pathway of the shielding element, such that the shielding element may travel past the RFID tags along the axis of motion. In an embodiment where the shielding element is positioned at one end of the pathway, the shielding element surrounding the RFID may shield the RFID tag and shield the RFID tag from receiving radio frequency signals. At the other end, the revealed tag may be open to be in communication with a transmitting system. Optionally, this embodiment may be implemented by making the RFID tags a set of moving components and affixing the position of the shielding element.

Figure 8:
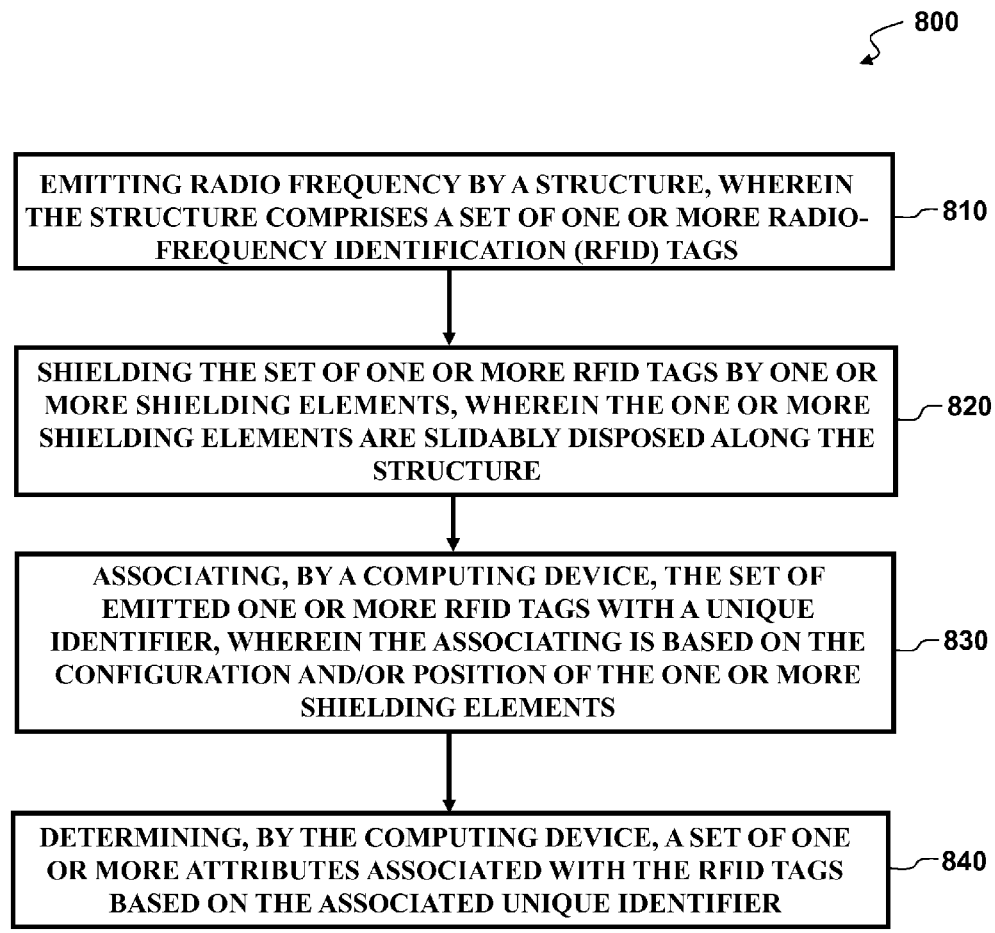
FIG. 8 is a flowchart of an exemplary process for determining an association of a set of RFID tags.

FIG. 8 is a flowchart of an exemplary process 800 in which the system comprises a computer and/or computing circuitry that may be configured to execute the steps as depicted. The method depicted in the flowchart includes the steps of: (a) emitting radio frequency by a structure, where the structure comprises a set of one or more radio-frequency identification (RFID) tags (step 810); (b) shielding the set of one or more RFID tags by one or more shielding elements, where the one or more shielding elements are slidably disposed along the structure (step 820); (c) associating, by a computing device, the set of emitted one or more RFID tags with a unique identifier, where the associating is based on the configuration/position of the one or more shielding elements (step 830); and optionally (d) determining, by the computing device, a set of one or more attributes associated with the RFID tags based on the associated unique identifier (step 840).

Figure 9:
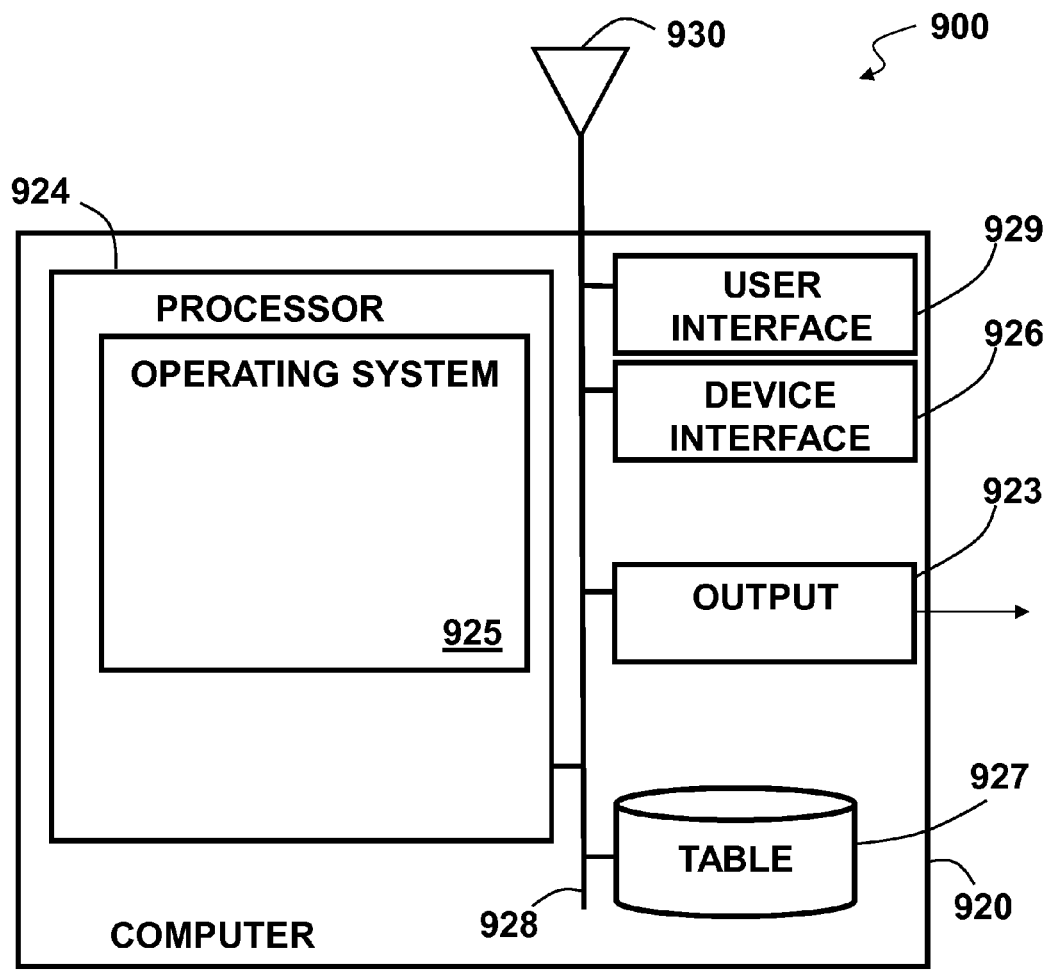
FIG. 9 illustrates an exemplary top level functional block diagram of a computing device embodiment.

FIG. 9 illustrates an exemplary top level functional block diagram of a computing device embodiment 900. The exemplary operating environment is shown as a computing device 920 comprising a processor 924, such as a central processing unit (CPU), a lookup table 927, e.g., an array, an external device interface 926, e.g., an optional universal serial bus port and related processing, and/or an Ethernet port and related processing, an output device interface 923, a receiver, e.g., antenna 930, and an optional user interface 929, e.g., an array of status lights and one or more toggle switches, and/or a display, and/or a keyboard and/or a pointer-mouse system and/or a touch screen. Optionally, the computing device may comprise an addressable memory where the addressable memory may, for example, be: flash memory, eprom, and/or a disk drive or other hard drive. These elements may be in communication with one another via a data bus 928. Via an operating system 925 such as a real-time operating system and/or an operating system. supporting a web browser and applications, the processor 924 may be configured to execute steps of a process, e.g., executing a rule set, according to the exemplary embodiments described above.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. A system comprising:
one or more shielding elements repositionable along a structure, the structure further comprising a set of one or more radio-frequency identification (RFID) tags, wherein the one or more shielding elements effect the radio frequency (RF) transmissibility of the set of one or more RFID tags thereby broadcasting differing identification tags based on shielding and un-shielding of one or more of the set of one or more RFID tags via the one or more shielding elements;
a first computing device comprising a processor, wherein the processor is configured to: receive a set of one or more RFID tags from the structure;
determine an association of the set of received one or more RFID tags with a unique identifier; and
assign a set of one or more attributes to the unique identifier based on the determined association of RFID tags; wherein the set of one or more attributes are assigned based on a measured signal strength by the first computing device of the broadcasted RF transmissibility of the set of one or more RFID tags; and
an image display device in communication with the first computing device, wherein the first computing device communicates the assigned set of one or more attributes to the image display to determine a state of the structure and mechanical movements of the one or more shielding elements related to the structure; and
obtain, using the first computing device, information pertaining to the state of the structure by determining a location of the structure via tracking the set of one or more RFID tags in relation to the image display device.

2. The system of claim 1 wherein the one or more shielding elements are slidably disposed along the structure.

3. The system of claim 1 wherein the one or more shielding elements effect the RF transmissibility of the set of one or more RFID tags via physical movement of the one or more shielding elements relative to the set of one or more RFID tags.

4. The system of claim 1 wherein one or more shielding elements are radio-frequency shielding elements.

5. The system of claim 1 wherein the set of one or more RFID tags and one or more shielding elements are disposed within the structure.

6. The system of claim 1 further comprising: a transceiver, wherein the transceiver comprises a transmitter and receiver.

7. The system of claim 6 further comprising a second computing device comprising a processor.

8. The system of claim 7 wherein the first computing device comprises the transceiver and wherein the second computing device comprises the transceiver.

9. The system of claim 8 wherein a member of the set of one or more RFID tags is an active RF element.

10. The system of claim 8 wherein a member of the set of one or more RFID tags is a passive RF element.

11. The system of claim 8 wherein at least one of: the first computing device; the second computing device; and the transceiver, is an active RF element.

12. The system of claim 1 wherein the structure is a stylus and mechanical movements comprise: depressing a stylus tip, depressing a button on the structure enabled by gripping the structure, releasing a button by lifting the structure, and actuating a roller mechanism by translating the structure on a surface.

13. A device comprising:
one or more shielding elements and a set of one or more radio-frequency identification (RFID) tags, wherein the device is configured to:
shield the set of one or more RFID tags by the one or more shielding elements, wherein the one or more shielding elements are repositionable along a structure;
emit radio frequency (RF) energy from a set of one or more RFID tags, wherein the RF emissions of the set of one or more RFID tags are based on a disposition of the shielding elements along the structure thereby broadcasting differing identification tags based on shielding and un-shielding of one or more of the set of one or more RFID tags via the one or more shielding elements;
change a measured signal strength of the emitted RF energy from the set of one or more RFID tags based on a selected configuration of the shielding elements thereby determine a state of the structure and mechanical movements of the one or more shielding elements related to the structure; and
provide information pertaining to the state of the structure, wherein the state comprises a color code and an erase code.

14. The device of claim 13 wherein the one or more shielding elements effect the RF transmissibility of the set of one or more RFID tags via physical movement of the one or more shielding elements relative to the set of one or more RFID tags.

15. The device of claim 13 wherein the one or more shielding elements are slidably disposed along the structure.

16. The device of claim 13 wherein the structure is a stylus.

17. A method comprising:

emitting radio frequency energy from a set of one or more radio-frequency identification (RFID) tags, wherein the set of one or more RFID tags are disposed in a structure;

shielding the set of one or more RFID tags by one or more shielding elements, wherein the one or more shielding elements are repositionable along the structure to effect the radio frequency (RF) transmissibility of the set of one or more RFID tags;

broadcasting differing identification tags based on shielding and un-shielding of one or more of the set of one or more RFID tags via the one or more shielding elements;

associating, by a computing device, the set of emitted one or more RFID tags with a unique identifier, wherein the associating is based on the disposition of the one or more shielding elements relative to the one or more RFID tags; and assigning, by the computing device, a set of one or more attributes to the unique identifier based on the determined association of RFID tags; wherein the assigning of the set of attributes is based on a measured signal strength, by the first computing device, of the broadcasted RF transmissibility of the set of one or more RFID tags;

communicating, by the computing device, the assigned set of one or more attributes to an image display in communication with the first computing device, to determine a state of the structure and mechanical movements of the one or more shielding elements related to the structure; and obtaining, by the computing device, information pertaining to the state of the structure by determining a location of the structure via tracking the set of one or more RFID tags in relation to the image display device.

18. The method of claim 17 further comprising:

determining, by the computing device, the set of one or more attributes associated with the RFID tags based on the associated unique identifier.

19. The method of claim 17 wherein the one or more shielding elements effect the RF transmissive capability of the set of one or more RFID tags.

20. The method of claim 17 wherein the structure is a stylus and mechanical movements comprise: depressing a stylus tip, depressing a button on the structure enabled by gripping the structure, releasing a button by lifting the structure, and actuating a roller mechanism by translating the structure on a surface.

* * * * *